United States Patent
Zimmerman

(10) Patent No.: US 8,740,117 B1
(45) Date of Patent: Jun. 3, 2014

(54) POULTRY LITTER COMPOSTING APPARATUS

(75) Inventor: Marlin M. Zimmerman, Richland, PA (US)

(73) Assignee: Binkley & Hurst, L.P., Wilmington, DE (US)

( * ) Notice: Subject to any disclaimer, the term of this patent is extended or adjusted under 35 U.S.C. 154(b) by 38 days.

(21) Appl. No.: 13/354,083

(22) Filed: Jan. 19, 2012

Related U.S. Application Data

(60) Provisional application No. 61/461,811, filed on Jan. 24, 2011.

(51) Int. Cl.
*B02C 9/04* (2006.01)
*B02C 23/02* (2006.01)

(52) U.S. Cl.
USPC ............. 241/101.762; 241/101.77; 241/185.5

(58) Field of Classification Search
USPC ............... 241/101.762, 101.77, 189.1, 185.5, 241/186.5, 260.1; 404/91
See application file for complete search history.

(56) References Cited

U.S. PATENT DOCUMENTS

| | | | | |
|---|---|---|---|---|
| 2,841,946 | A * | 7/1958 | Sutherland et al. | 56/289 |
| 3,739,994 | A * | 6/1973 | McFarland | 241/74 |
| 3,893,780 | A * | 7/1975 | Gutman et al. | 404/91 |
| 4,619,412 | A | 10/1986 | Willingham | |
| 4,798,472 | A * | 1/1989 | Chan et al. | 366/89 |
| 4,854,507 | A | 8/1989 | Smith | |
| 5,078,328 | A | 1/1992 | Willingham | |
| 5,143,309 | A | 9/1992 | Endom | |
| 6,467,432 | B1 | 10/2002 | Lewis | |
| 6,820,358 | B1 | 11/2004 | Huelsewiesche | |
| 7,028,932 | B2 * | 4/2006 | Lucas et al. | 241/101.8 |
| 7,628,346 | B1 | 12/2009 | Darden | |

* cited by examiner

*Primary Examiner* — Faye Francis
(74) *Attorney, Agent, or Firm* — Miller Law Group, PLLC

(57) ABSTRACT

An apparatus mounted on a tractor processes caked and compacted poultry litter while still located in the poultry house to initiate a composting process. The apparatus engages the caked poultry litter with a primary beater assembly formed with toothed beater paddles to aggressively disintegrate the poultry litter into small pieces. The primary beater assembly rotates in an undershot manner to convey disintegrated poultry litter upward and rearwardly from behind the primary beater assembly into a processing chamber housing an auger mechanism formed with cutting blades along the periphery of the auger fighting to further disintegrate the litter. The auger mechanism conveys the collected poultry litter laterally for discharge from the apparatus into a windrow where composting activity can initiate. The auger mechanism includes single auger flighting at a remote end of the auger and a double auger fighting at the discharge end of the mechanism.

17 Claims, 9 Drawing Sheets

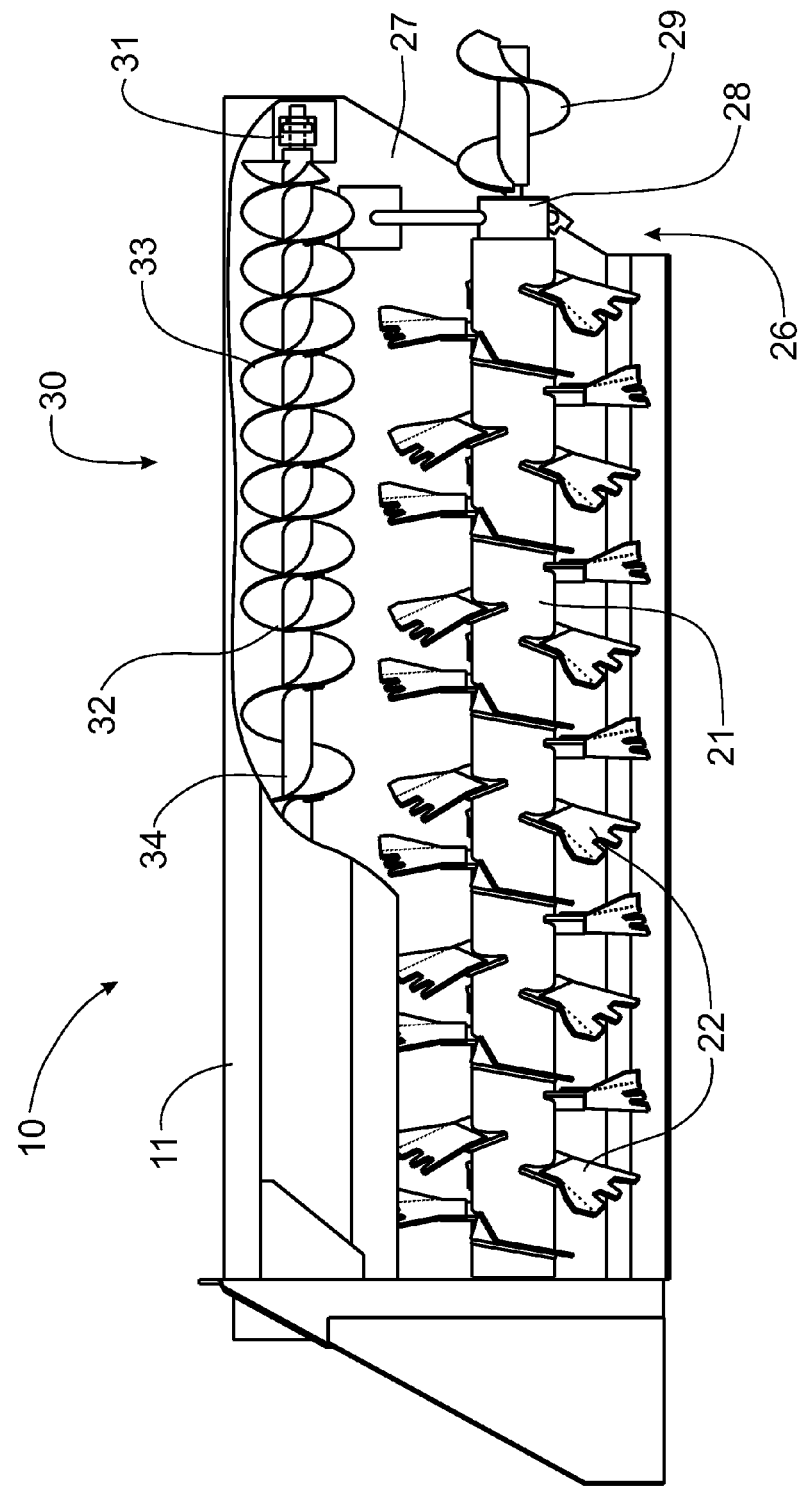

POULTRY LITTER COMPOSTING APPARATUS

CROSS-REFERENCE TO RELATED APPLICATIONS

This application claims domestic priority on U.S. Provisional Patent Application Ser. No. 61/461,811, filed on Jan. 24, 2011, the content of which is incorporated herein by reference.

FIELD OF THE INVENTION

The present invention generally relates to an apparatus for conditioning poultry litter while still present in a poultry house and, more particularly, to an apparatus that will break up, mix and windrow poultry litter to initiate composting thereof.

BACKGROUND OF THE INVENTION

Raising poultry, particularly broiler chickens, is a major industry. A typical chicken house can be hundreds of feet long and forty feet or more wide. In the Northern states, these poultry houses have walls; however, in the Southern states, where below freezing temperatures are rare, the poultry houses can be open on the sides, although curtains can temporarily close off the sides in the event of inclement weather. The floors of the poultry house can be formed of concrete or other materials, including compacted and leveled earth.

Present poultry raising techniques have chicks grow to broiler size in approximately seven weeks. After several weeks as the grow-out of the poultry progresses, the floor of the poultry house is covered with poultry litter, which is defined as material that becomes caked and compacted with droppings and other moisture. After each batch of chickens is removed from the poultry house, the floor of the chicken raising area must be prepared for a new batch of chicks, by eliminating or reconditioning the poultry litter. Eventually, the accumulation of poultry litter will be sufficient as to require additional treatment. Preferably, the poultry litter is composted, either after removal from the poultry house or even within the poultry house before a new batch of chicks are placed therein.

Composted poultry litter is a valuable commodity that is a by-product of operating a poultry raising facility. A variety of devices have been designed for reconditioning the organic floor covering material for reuse. Other machines have been devised to windrow poultry litter to initiate the composting process. In order for the poultry litter to compost within the windrow, the caked and moist litter material must be pulverized and thoroughly mixed and fluffed to allow air to circulate through and around it to remove moisture and ammonia, and to facilitate the digestion of the poultry litter to create compost.

Poultry litter disintegrating and reconditioning machines having flail rotors for comminuting the litter are disclosed in U.S. Pat. No. 4,619,412, granted to Jack Willingham on Oct. 28, 1986, and in U.S. Pat. No. 5,078,328, also granted to Jack Willingham, on Jan. 7, 1992. In the '412 machine, a rearwardly and upwardly inclined scraper blade is positioned forward of and over the full axial length of the flail rotor. As the machine is advanced, the blade scrapes a layer of the litter from the poultry floor. The layer then moves rearwardly and upwardly along the inclined scraper blade into the operating zone of the rotor flail members, which disintegrate the litter as it moves rearwardly off the upper edge of the scraper blade. During this operation, gouging or digging of the scraper blade into the ground surface is prevented by setting the leading edge of the blade a predetermined distance above the ground surface.

The cutting and lifting of the litter from the ground surface requires not only appreciable power, but care must be used in retaining the ground adjustment of the blade. In the '328 machine, ripper teeth extended forward of and mounted on the side walls of the machine act with the forward edges of the side walls to provide a section of litter for travel between the side walls. On advance of the machine, the section of litter between the side walls is acted upon by a rotary flail unit extended between and mounted on the side walls rearwardly of the ripper teeth for disintegration and discharge back to the ground floor for reuse. The density of the discharged litter material may be varied by varying its rate of discharge from the machine.

Similar poultry litter disintegration and reconditioning machines are disclosed in U.S. Pat. No. 4,854,507, issued to Gordon Smith on Aug. 8, 1989, and in U.S. Pat. No. 5,143,309, issued on Sep. 1, 1992, to Edward Endom, where the poultry litter is scraped from the floor and elevated into the path of a flail rotor. In the '309 patent, the flails are mounted in opposing spiral paths around the rotor, while in the '507 patent, the flails are simply mounted in staggered rows around the circumference of the rotor.

In U.S. Pat. No. 6,467,432, granted to Robert Lewis, et al, on Oct. 22, 2002, an implement for reconditioning poultry litter is disclosed wherein the rotor engaging the bed of poultry litter is formed of angled beaters fixed to the rotor core. The angled beaters are oppositely angled on successive rows around the circumference of the rotor core so that the litter isn't consistently conveyed to one side of the implement. U.S. Pat. No. 7,628,346, issued to John Darden on Dec. 8, 2009, the rotor is formed by convoluted flail members that extend around the circumference of the rotor core with blades folded in opposing directions.

In U.S. Pat. No. 6,820,358, granted on Nov. 23, 2004, to Louie Huelsewiesche, a self-propelled machine is disclosed that incorporates an auger that gathers poultry litter from a wide swath within a poultry house and deposits that gathered poultry litter into a consolidated windrow behind the machine. The auger mechanism at the front of the machine conveys the poultry litter toward the center of the machine where the central portion of the transverse auger lifts the gathered poultry litter from in front of the auger mechanism and passes the poultry litter in an overshot manner over the top of the auger onto a conveyor belt. The conveyor belt elevates the collected poultry litter to the rear of the machine where the poultry litter is dropped back onto the floor of the poultry house in a fluffed windrow.

Accordingly, it would be desirable to provide an apparatus that would be more effective in pulverizing caked poultry litter and creating a disintegrated and fluffed windrow of poultry litter in which composting of the windrowed poultry litter can start.

SUMMARY OF THE INVENTION

It is an object of this invention to overcome the aforementioned disadvantages of the prior art by providing an apparatus that will effectively disintegrate caked and compacted poultry litter and convey the poultry litter into a fluffy windrow offset to the side of the apparatus.

It is another object of this invention that a primary beater is utilized to break up and pulverize the caked and compacted poultry litter.

It is a feature of this invention that the primary beater assembly is formed with a plurality of toothed beater paddles that tear into poultry litter collected on the floor of a poultry house.

It is an advantage of this invention that adjacent toothed beater paddles are mounted in opposing orientations to minimize lateral conveying of the poultry litter engaged thereby.

It is another feature of this invention that the beater paddles elevate the disintegrated poultry litter upwardly to an upper auger mechanism that conveys the collected poultry litter into a windrow positioned laterally of the apparatus.

It is another advantage of this invention that the upper auger mechanism receives the collected poultry litter in an undershot manner from below and behind the auger mechanism.

It is still another feature of this invention that the auger mechanism incorporates cutting blades mounted on the edge of the auger flighting to further break up chunks of poultry litter as the auger mechanism receives the collected poultry litter from the beater paddles on the primary beater assembly.

It is still another object of this invention that the apparatus incorporates an upper auger mechanism that receives disintegrated poultry litter from the primary beater assembly to convey the collected poultry litter into a windrow located laterally of the apparatus.

It is yet another feature of this invention that the primary beater assembly feeds disintegrated poultry litter to the upper auger mechanism in an undershot manner.

It is yet another advantage of this invention that any material falling from the auger mechanism as the material is being conveyed laterally along the apparatus will be fed back upwardly into the auger mechanism by the undershot primary beater assembly.

It is yet another object of this invention to provide an apparatus that can be mounted on a prime mover, such as a tractor, to be moved through the poultry house and to be operatively powered by the prime mover.

It is still another feature of this invention that the toothed beater paddles on the primary beater are individually mounted on a central core in an overlapping configuration to provide an aggressive disintegration of the poultry litter engaged thereby.

It is a further feature of this invention that the auger mechanism is formed with a single auger flighting over a distal portion of the auger mechanism and a double auger flighting over a proximal portion of the auger mechanism where the collected poultry litter is discharged into a windrow.

It is yet another advantage of this invention that the transfer rate of the rotating auger mechanism is increased at the discharge end by the double auger flighting configuration.

It is another feature of this invention that the primary beater assembly includes a stub auger at the proximal, discharge end thereof to receive collected poultry litter discharged from the upper auger mechanism.

It is a further advantage of this invention that the stub auger mounted on the proximal end of the primary beater assembly assists in the distribution of the discharged collected poultry litter from the auger mechanism above the primary beater into a windrow suitable for initiating composting of the poultry litter.

It is a further object of this invention to provide an apparatus for processing poultry litter to initiate composting activity which is durable in construction, inexpensive of manufacture, carefree of maintenance, facile in assemblage, and simple and effective in use.

These and other objects, features and advantages are accomplished according to the instant invention by providing an apparatus for processing caked and compacted poultry litter while still located in the poultry house to initiate a composting process. The apparatus engages the caked poultry litter with a primary beater assembly formed with toothed beater paddles to aggressively disintegrate the poultry litter into small pieces. The primary beater assembly rotates in an undershot manner to convey disintegrated poultry litter upward and rearwardly from behind the primary beater assembly into a processing chamber housing an auger mechanism formed with cutting blades along the periphery of the auger flighting to further disintegrate the litter. The auger mechanism conveys the collected poultry litter laterally for discharge from the apparatus into a windrow where composting activity can initiate. The auger mechanism includes single auger flighting at a remote end of the auger and a double auger flighting at the discharge end of the mechanism.

BRIEF DESCRIPTION OF THE DRAWINGS

The advantages of this invention will be apparent upon consideration of the following detailed disclosure of the invention, especially when taken in conjunction with the accompanying drawings wherein:

FIG. 11 is a front elevational view of the apparatus with a portion of the sheet metal broken away to depict the relationship between the primary beater assembly and the auger mechanism, the three-point hitch mounting mechanism being broken away for purposes of clarity.

DETAILED DESCRIPTION OF THE PREFERRED EMBODIMENT

Figure 1:
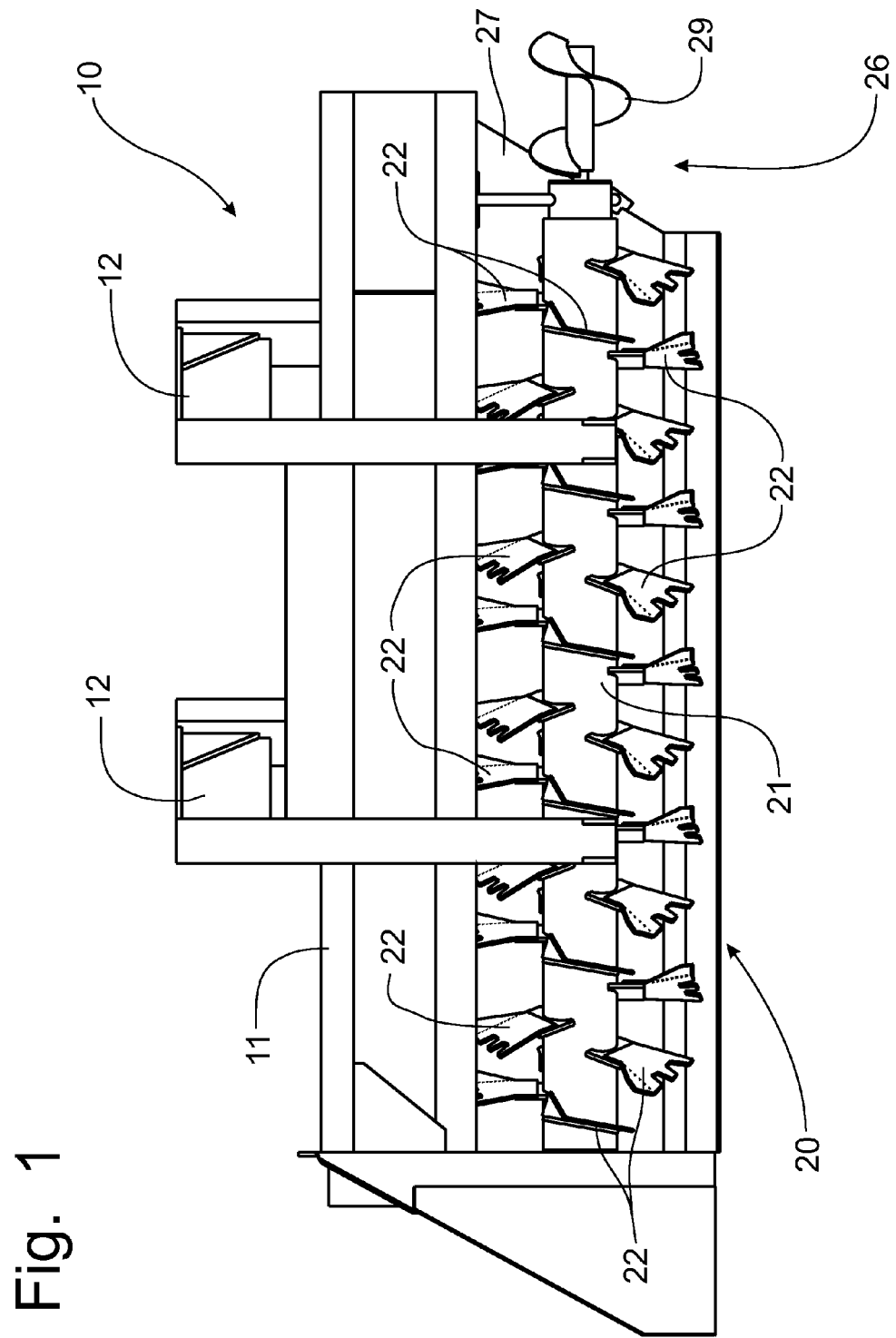
FIG. 1 is a front elevational view of the apparatus for processing poultry litter incorporating the principles of the instant invention.
Figure 2:
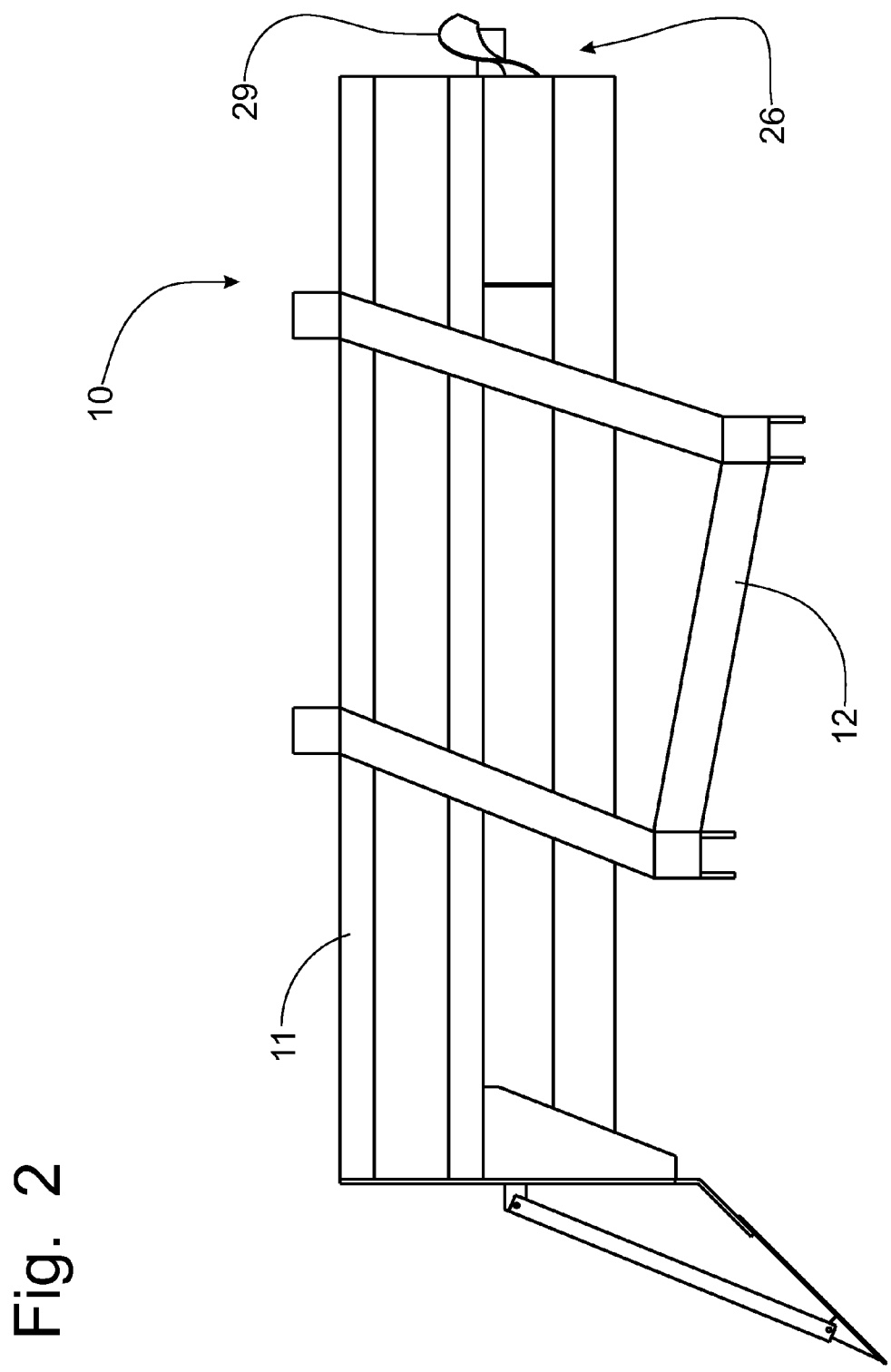
FIG. 2 is a top plan view of the apparatus shown in FIG. 1.
Figure 3:
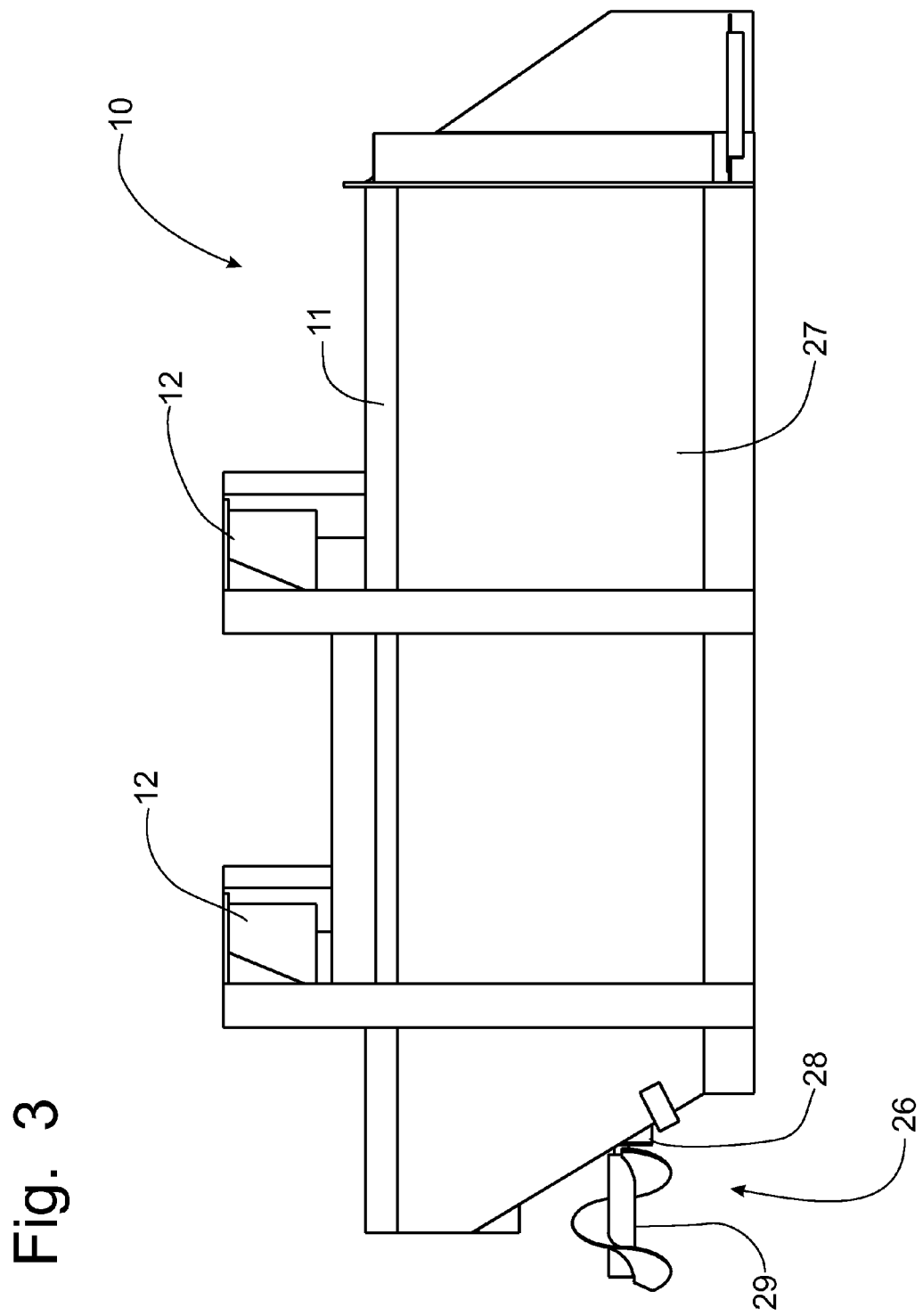
FIG. 3 is a rear elevational view of the apparatus shown in FIG. 1.
Figure 4:
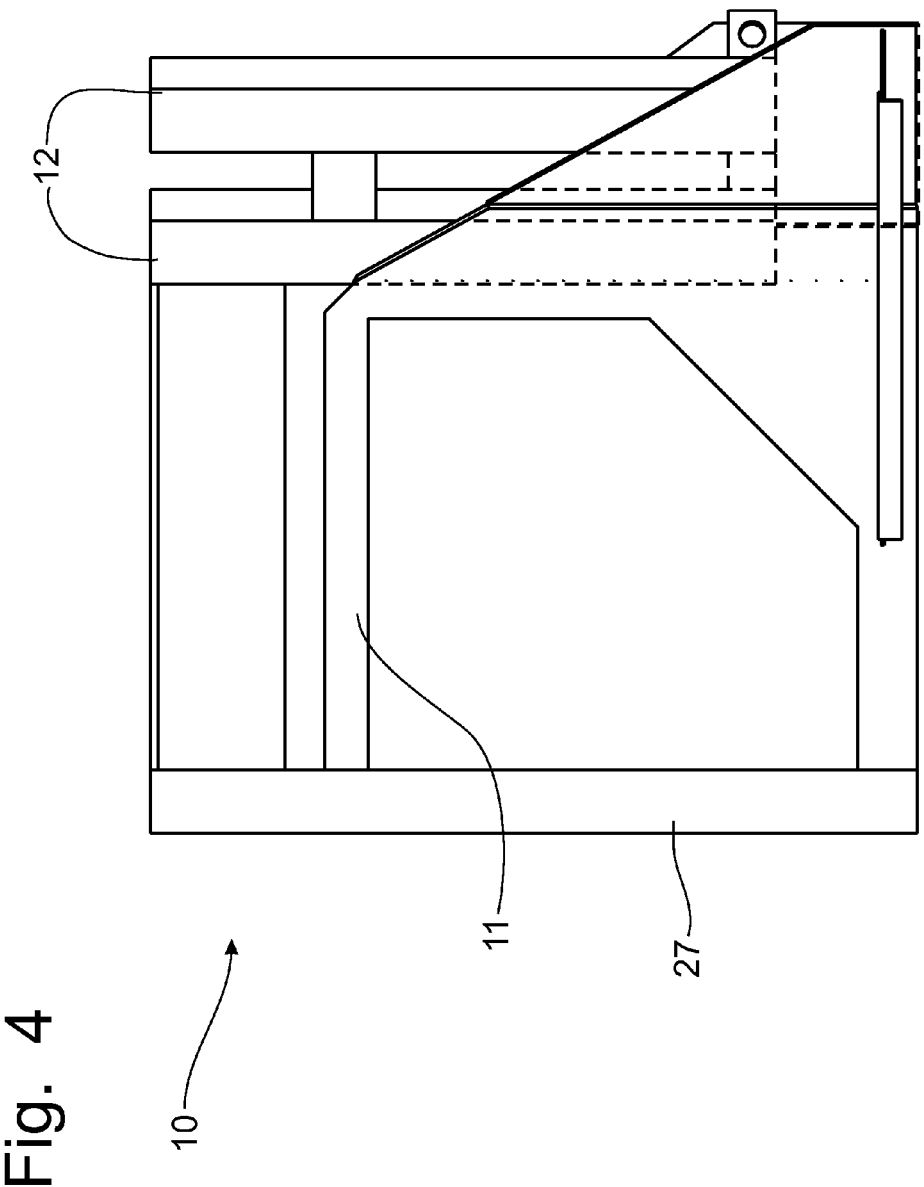
FIG. 4 is a right side elevational view of the apparatus shown in FIG. 1.

Referring to FIGS. 1-11, a poultry litter processing apparatus incorporating the principles of the instant invention for processing poultry litter while in the poultry house to initiate a composting process can best be seen. Left, right, front and rear references are use as a matter of convenience and are determined by standing at the rear of the apparatus 10 facing the three-point hitch mechanism utilized to mount the implement to a prime mover (not shown), which is the normal direction of travel of the implement. The poultry litter processing apparatus 10 has a frame 11 that preferably includes a conventional three-point hitch mount 12 that allows the implement 10 to be supported on a tractor (not shown) or other prime mover equipped with a three-point hitch mechanism 12 to move the implement 10 along the direction of travel. Operative power can be provided through a typical mechanical drive mechanism (not shown) detachably connected to the tractor PTO (not shown) in a conventional manner.

The apparatus 10 is formed with a transversely oriented primary beater assembly 20 that is rotatably supported in the frame 11 by laterally spaced bearings 28 at a lower portion thereof to engage caked and compacted poultry litter on the floor of the poultry house. The primary beater assembly 20 is preferably formed with a plurality of beater paddles 22 individually mounted on a central core 21, which can be either tubular or box-shaped. To facilitate the replacement of the beater paddles 22, each beater paddle 22 is preferably connected by detachable fasteners to a mounting bracket 23 that is welded to the central core 21. Thus, if the beater paddles 22 strike an object within the poultry litter that damages the beater paddle 22, replacement thereof is simply a matter of disconnecting the fasteners and attaching a new beater paddle 22 to the mounting bracket 23.

Preferably, the beater paddles 22 are formed as toothed members having teeth 24 projecting from the end of the beater paddle 22 in a serrated configuration. Also, the beater paddle 22 can be formed with a bent flange 25 along the side of the beater paddle 22 to facilitate the movement of the poultry litter engaged by the beater paddle 22 during operation thereof. The beater paddles 22 can be mounted in a spiral pattern around the circumference of the central core 21. The beater paddles 22 can be mounted in an opposingly faced orientation, as is depicted in FIG. 1, in which adjacent beater paddles 22 are angled with respect to the direction of rotation of the primary beater assembly 20 in opposite directions. As a result, the rotating primary beater assembly 20 will not be effective in conveying poultry litter laterally. As an alternative, the beater paddles 22 can be mounted so as to be angled toward the discharge end 26 such that the rotation of the primary beater assembly 20 not only breaks up the caked and compacted poultry litter from the floor of the poultry house, but also operates to convey the material laterally toward the discharge end 26.

The main function of the primary beater assembly 20 is to aggressively disintegrate the accumulated poultry litter on the floor of the poultry house and convey the disintegrated poultry litter vertically into the upper auger mechanism 30 located above and rearwardly of the primary beater assembly 20. As is best seen by the arrow 18 in FIG. 5, the primary beater assembly 20 is rotated counterclockwise, when viewed from the left side of the apparatus 10, which is the discharge end 26 of the primary beater assembly. In this manner, the primary beater assembly 20 serves as an undershot conveyor to elevate the disintegrated poultry litter from underneath the central core 21 upwardly into the auger mechanism 30. The rear wall 27 of the apparatus 10 cooperates with the beater paddles 22 to guide the disintegrated poultry litter upwardly to the upper auger mechanism 30.

The upper auger mechanism 30 includes a transversely oriented screw conveyor 32 rotatably supported from the frame 11 by laterally spaced bearings 31 with a single flighting portion 34 on the right end of the conveyor 32 and a double flighting portion 33 along the left, or discharge, end of the conveyor 32. The provision of the double auger flighting increases the transfer rate of the screw conveyor 32 over the left end of the auger mechanism 30 to prevent plugging of the auger mechanism 30 due to the accumulation of material therein from the left side added to the additional material fed into the auger mechanism 30 by the beater assembly 20. As an alternative, the screw conveyor 32 could be manufactured with a single flighting that has the pitch increased to increase the transfer rate of the screw conveyor 32. In fact, the pitch of the flighting could be increased from the right end to the left discharge end in a progressive manner to provide a continuously increasing transfer rate along the length of the screw conveyor 32.

The screw conveyor 32 is rotatably supported within a housing 35 that encircles the conveyor 32 except for an inlet opening 36 facing downwardly along the rear wall 27 of the apparatus 10. The screw conveyor 32 also rotates clockwise, when viewed from the left discharge end, as depicted by the arrow 19 in FIG. 5, to receive the disintegrated poultry litter from the primary beater assembly 20 and convey the collected poultry litter laterally toward the discharge end 26.

Figure 5:
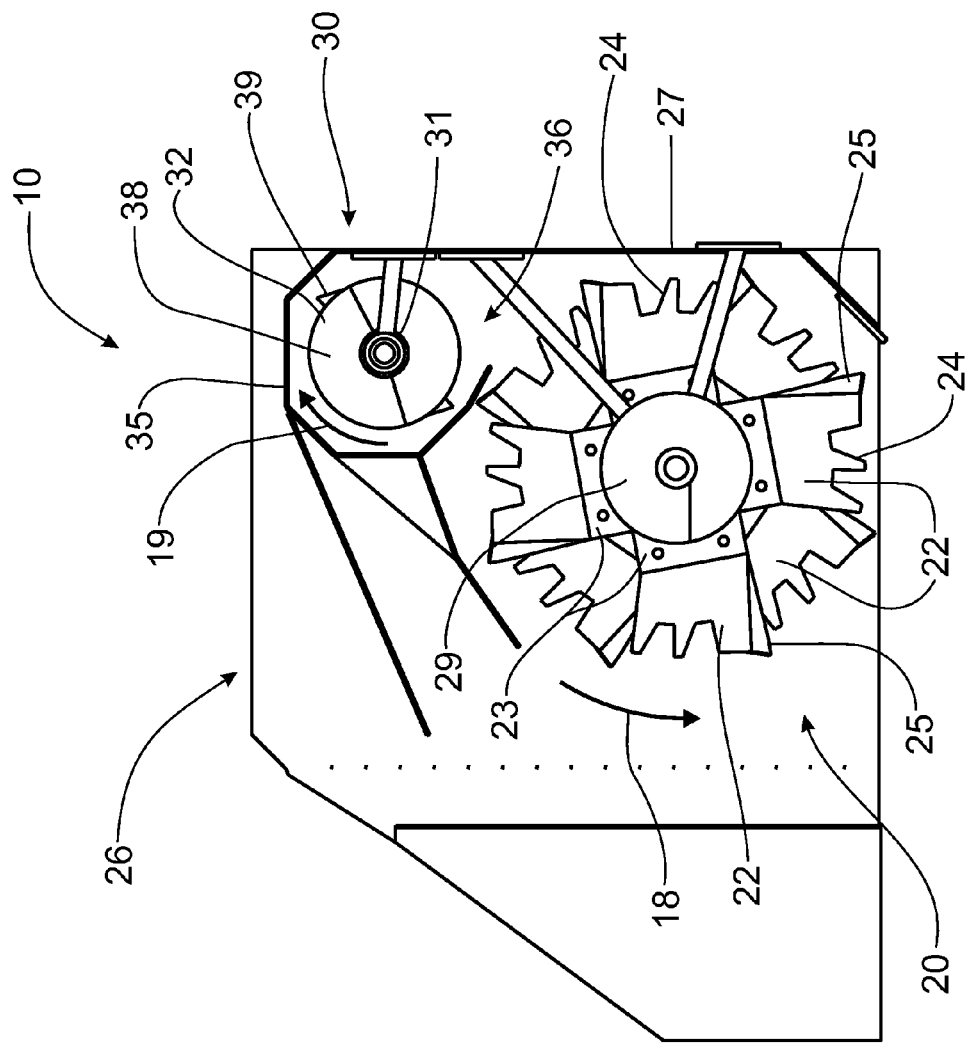
FIG. 5 is a left side elevational view of the apparatus shown in FIG. 1 with the three-point hitch mounting mechanism being removed for purposes of clarity.
Figure 6:
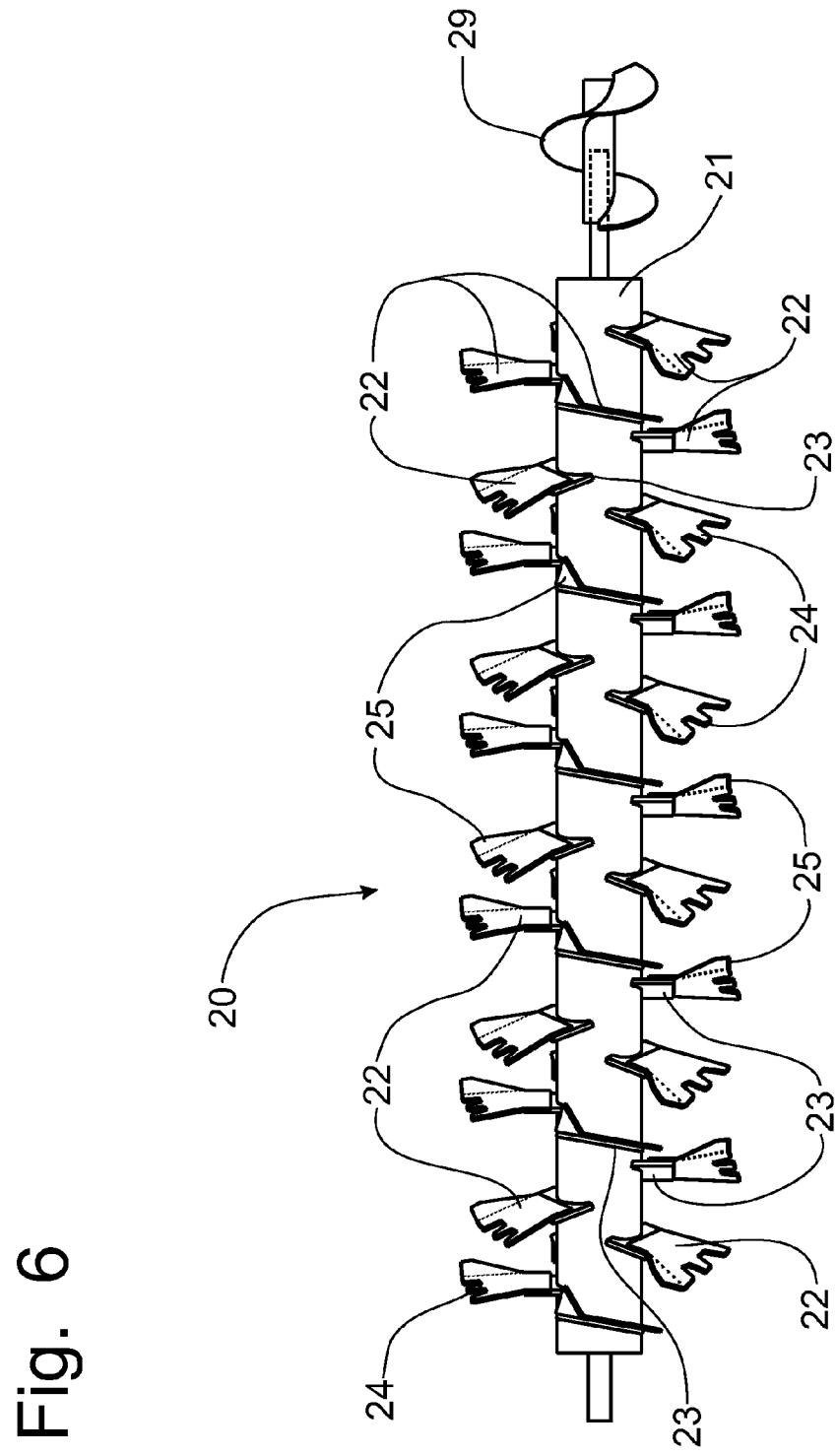
FIG. 6 is a front elevational view of the primary beater assembly, the optional stub auger being depicted on the discharge end of the beater assembly.
Figure 7:
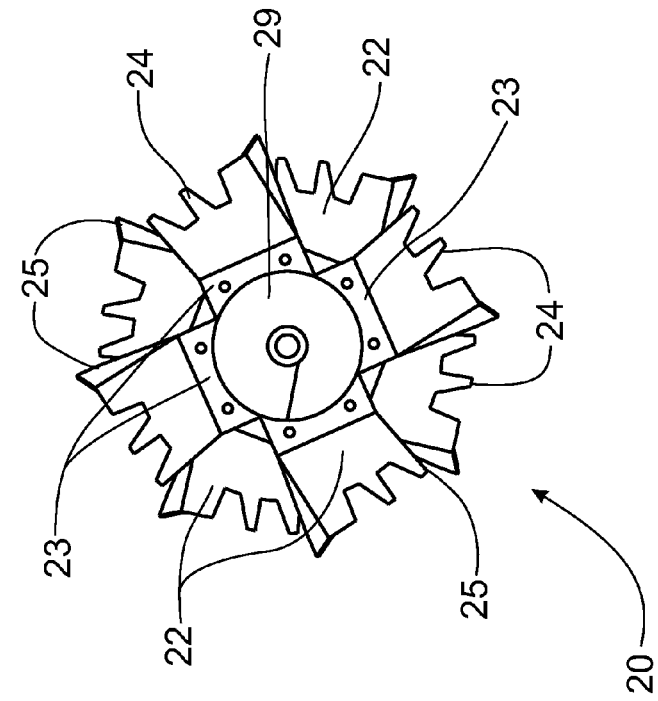
FIG. 7 is an enlarged right end view of the primary beater assembly.
Figure 8:
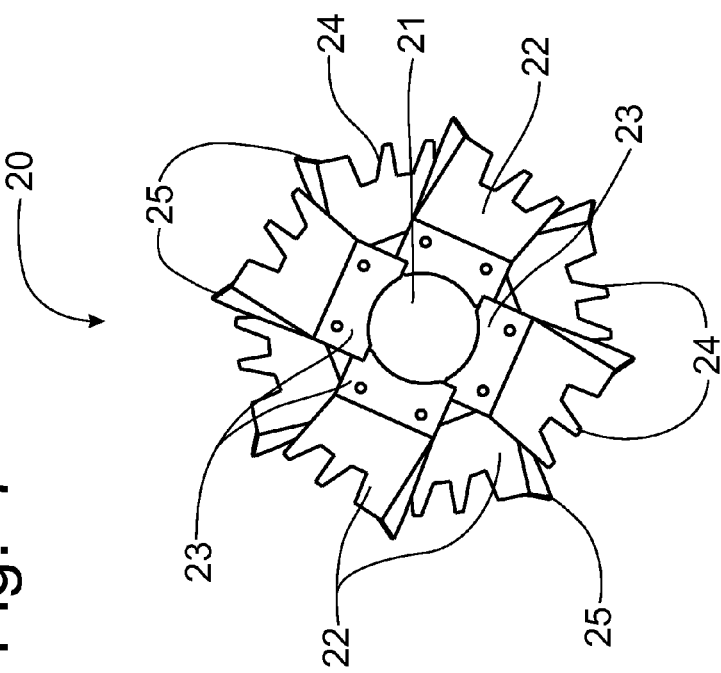
FIG. 8 is an enlarged left end view of the primary beater assembly as depicted in FIG. 6.
Figure 9:
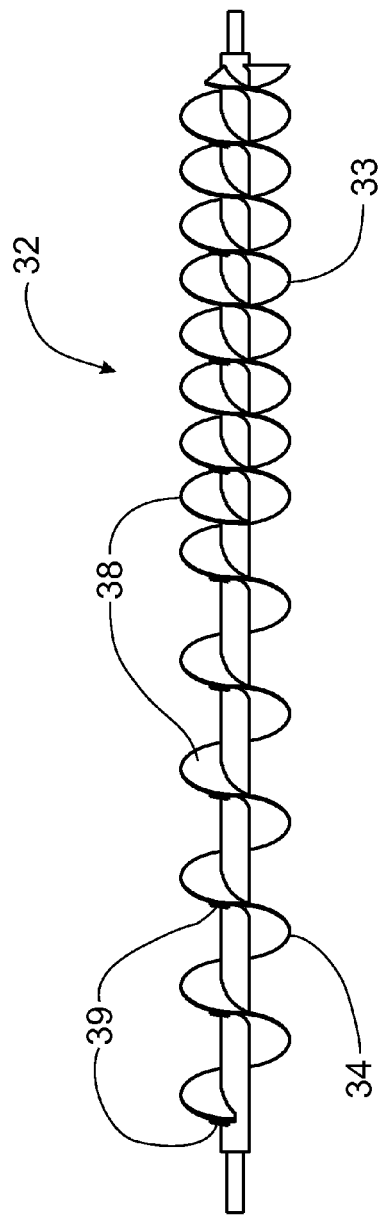
FIG. 9 is a front elevational view of the upper auger mechanism.
Figure 10:
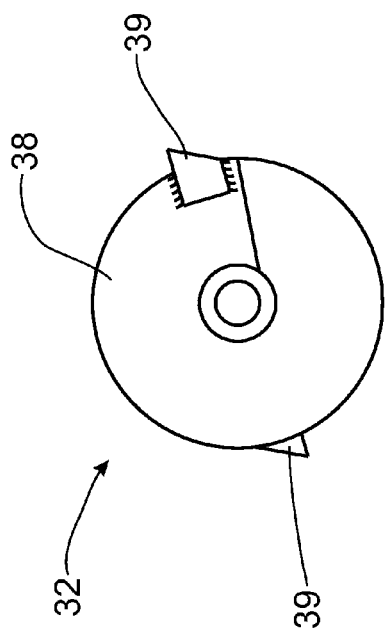
FIG. 10 is an enlarged right end view of the upper auger mechanism.

The screw conveyor 32 further includes a plurality of cutting blades 39 attached to and projecting outwardly from the flighting 38 on both the double and single flighting portions 33, 34. Upon rotation of the screw auger 32, the cutting blades 39, which are preferably arranged at circumferentially opposite sides of the flighting 38, as is shown in FIGS. 5, 10 and 11, operate to further disintegrate the collected poultry litter as the litter is being received into the upper auger mechanism 30 and as the collected poultry litter is conveyed along the housing trough 35. Preferably, the cutting blades 39 are sharpened along the diagonally extending side so that the sharpened edge cuts through the collected poultry litter upon rotation of the screw conveyor 32. The screw conveyor 32 simply extrudes the collected poultry litter out of the discharge end 26 to fall downwardly onto the floor of the poultry house. An optional stub auger 29 can be mounted on the discharge end of the primary beater assembly 20 to help distribute the collected poultry litter into a windrow offset from the discharge end 26 of the apparatus 10.

In operation, the poultry litter processing apparatus 10 is mounted on, or connected to, a prime mover (not shown) to provide movement and operative power to the apparatus 10. Preferably, the apparatus 10 will be mounted on the three-point hitch mechanism of the prime mover by connection thereof to the three-point hitch mount 12 and operative power provided by a PTO connection or via a hydraulic system carried by the prime mover. The poultry litter processing apparatus 10 can then be placed into engagement with the layer of poultry litter accumulated on the floor of a poultry house, which is typically caked and compacted.

The primary beater assembly 20 is rotated to drive the beater paddles 22 into the accumulated poultry litter as the apparatus 10 is moved along the floor of the poultry house. The toothed beater paddles 22 aggressively tear into the caked and compacted accumulated poultry litter to disintegrate the poultry litter into fine pieces. The undershot primary beater assembly 20 pulls the disintegrated poultry litter beneath the central core 21 and lifts the disintegrated poultry litter upwardly along the rear wall 27 of the apparatus. The rear wall 27 guides the upwardly moving disintegrated poultry litter into the inlet opening 36 in the housing (or shroud) 35 where the collected poultry litter is engaged by an upper auger mechanism 30.

The cutting blades 39 mounted on the peripheral edge of the auger fighting 38 operate to continue to disintegrate any larger pieces of the collected poultry litter as the collected material is received into the screw conveyor 32 within the housing 35. The rapidly rotating screw conveyor 32 conveys the collected poultry litter laterally to the discharge end 26 of the apparatus 10 where the conveyed poultry litter is dropped into a windrow outboard of the apparatus 10. A stub auger 29 on the proximal end of the primary beater assembly 20 engages some of the conveyed poultry litter discharged from the auger mechanism 30 to help arrange the discharged material into a fluffy windrow in which the composting process can be initiated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

For example, one skilled in the art will recognize that other conventional forms of propulsion and operatively powering the components of the apparatus 10 may be utilized, such as a drawbar hitch, a quick attach mount for a skid steer loader, or even a self-propelled configuration. Rotational power to the primary beater assembly and the auger mechanism can be provided mechanically through a power takeoff drive mechanism, or by connection to the prime mover's hydraulic system, e.g. tractor or skid steer loader hydraulic system, that operates a hydraulic motor and associated gearbox.

Having thus described the invention, what is claimed is:

1. An apparatus for processing poultry litter comprising:
   a frame movable in a forward direction of travel, said frame including a rear wall;
   a transverse primary beater assembly rotatably supported on said frame forwardly of said rear wall, said primary beater assembly including a central core having a plurality of radially projecting beater paddles mounted thereon, said primary beater assembly being rotated in an undershot manner to convey poultry litter engaged by said beater paddles beneath said central core and then upwardly along said rear wall behind said central core;
   a transverse auger mechanism rotatably supported on said frame above and rearwardly of said primary beater assembly, said auger mechanism including a screw conveyor rotatably operable within an elongated transverse housing, said housing having an inlet opening facing downwardly and being positioned adjacent said rear wall to receive the poultry litter conveyed upwardly along said rear wall by said primary beater assembly, said auger mechanism conveying the poultry litter received thereby to a discharge end of said apparatus to be dropped from said auger mechanism into a windrow, said auger mechanism extending laterally beyond said beater paddles to enable the discharge of said poultry litter from said apparatus outboard of said beater paddles; and
   a drive mechanism for rotating said primary beater assembly and said auger mechanism to engage and disintegrate the poultry litter and to discharge the disintegrated poultry litter into a windrow along the discharge end of said apparatus.

2. The apparatus of claim 1 wherein each said beater paddle is formed with a toothed peripheral surface for aggressively disintegrate the poultry litter.

3. The apparatus of claim 2 wherein each said beater paddle is detachably secured to a mounting bracket affixed to said central core.

4. The apparatus of claim 2 wherein said screw conveyor is formed with a flighting having mounted thereon a plurality of cutting blades projecting outwardly from said flighting.

5. The apparatus of claim 4 wherein said auger mechanism includes a double flighting portion and a single flighting portion, said double flighting portion being proximate to said discharge end of said apparatus.

6. The apparatus of claim 4 wherein said cutting blades are secured to said flighting at diametrically opposed position along said flighting.

7. The apparatus of claim 4 wherein primary beater assembly is formed with a stub auger mounted at a discharge end thereof to engage poultry litter discharged from said auger mechanism.

8. An apparatus for processing poultry litter for composting, comprising:
   a frame adapted for connection to a prime mover providing movement of said apparatus in a forward direction and operative power, said frame including a generally vertical rear wall;
   a primary beater assembly transversely oriented and rotationally supported on said frame, said beater assembly being positioned for engagement with poultry litter to cause disintegration thereof, said primary beater assembly being operable to convey disintegrated poultry litter rearwardly beneath said primary beater assembly and upwardly along said rear wall;
   an auger mechanism including a screw conveyor operatively associated with a housing extending transversely along said rear wall, said housing having an opening therein facing downwardly along said rear wall to receive disintegrated poultry litter from said primary beater assembly, said screw conveyor including a flighting member having a first portion with a first flighting spacing and a discharge end with a second flighting spacing, said second flighting spacing being smaller than said first flighting spacing, said second flighting spacing extending outboard of said primary beater assembly to enable discharge of said poultry litter from said apparatus; and
   cutting blades mounted on said screw conveyor to chop said disintegrated poultry litter upon rotation of said screw conveyor as said disintegrated poultry litter is received within said housing.

9. The apparatus of claim 8 wherein said cutting blades are mounted on a peripheral edge of said flighting member on said screw conveyor.

10. The apparatus of claim 9 wherein said screw conveyor is formed with double flighting members along said discharge end of said screw conveyor, said double flighting members defining said second flighting spacing as being half of said first flighting spacing, said cutting blades being mounted on both said flighting members.

11. The apparatus of claim 9 wherein said primary beater assembly includes a plurality of beater paddles mounted on a central core for rotation about a first axis of rotation.

12. The apparatus of claim 11 wherein said screw conveyor is mounted for rotation about a second axis of rotation, said second axis of rotation being located above and rearwardly of said first axis of rotation.

13. An apparatus for processing poultry litter comprising:
   a frame movable in a forward direction of travel, said frame including a rear wall and a discharge end oriented laterally to said forward direction of travel;
   a transverse primary beater assembly rotatably supported on said frame forwardly of said rear wall, said primary beater assembly including a central core having a plurality of radially projecting beater paddles mounted thereon, said primary beater assembly being rotated in an undershot manner to convey poultry litter engaged by said beater paddles beneath said central core and then upwardly along said rear wall, said primary beater assembly including a stub auger mounted at said discharge end;

a transverse auger mechanism rotatably supported on said frame above and rearwardly of said primary beater assembly, said auger mechanism including a screw conveyor rotatably operable within an elongated transverse housing, said housing having an inlet opening positioned to receive the poultry litter conveyed upwardly along said rear wall by said primary beater assembly, said auger mechanism conveying the poultry litter received thereby to a discharge end of said apparatus to be dropped from said auger mechanism, said stub auger on said primary beater assembly engaging poultry litter discharged from said auger mechanism and depositing said poultry litter into a windrow; and a drive mechanism for rotating said primary beater assembly and said auger mechanism to engage and disintegrate the poultry litter and to discharge the disintegrated poultry litter into a windrow along the discharge end of said apparatus.

14. The apparatus of claim 13 wherein said auger mechanism extends laterally beyond said beater paddles to enable the discharge of said poultry litter from said apparatus onto said stub auger.

15. The apparatus of claim 14 wherein said screw conveyor includes a flighting member having a first portion with a first flighting spacing and a discharge end with a second flighting spacing, said second flighting spacing being smaller than said first flighting spacing.

16. The apparatus of claim 15 wherein said flighting member has mounted thereon a plurality of cutting blades projecting outwardly from said flighting member at diametrically opposed positions along said flighting member.

17. The apparatus of claim 16 wherein said auger mechanism includes double flighting members at said discharge end and a single flighting member at said first portion, said double flighting members defining said second flighting spacing as being half of said first flighting spacing.

* * * * *